US011840954B2

(12) United States Patent
Blaxill et al.

(10) Patent No.: US 11,840,954 B2
(45) Date of Patent: Dec. 12, 2023

(54) SPARK IGNITED ENGINE WITH A PRE-CHAMBER, A PRECHAMBER AND AN ADAPTER INSERT FOR THE ENGINE

(71) Applicant: Mahle International GmbH, Stuttgart (DE)

(72) Inventors: Hugh Blaxill, Novi, MI (US); Michael Bassett, Northampton (GB); Michael Bunce, Plymouth, MI (US); Adrian Cooper, Northampton (GB)

(73) Assignee: Mahle International GmbH

( * ) Notice: Subject to any disclaimer, the term of this patent is extended or adjusted under 35 U.S.C. 154(b) by 0 days.

(21) Appl. No.: 17/802,125

(22) PCT Filed: Feb. 24, 2020

(86) PCT No.: PCT/US2020/019413
§ 371 (c)(1),
(2) Date: Aug. 24, 2022

(87) PCT Pub. No.: WO2021/173107
PCT Pub. Date: Sep. 2, 2021

(65) Prior Publication Data

US 2023/0124163 A1 Apr. 20, 2023

(51) Int. Cl.
*F02B 19/12* (2006.01)
*F02B 19/18* (2006.01)
(Continued)

(52) U.S. Cl.
CPC .............. *F02B 19/12* (2013.01); *F02B 19/18* (2013.01); *F02P 3/02* (2013.01); *H01T 13/54* (2013.01)

(58) Field of Classification Search
CPC .. F02B 19/12; F02B 19/18; F02P 3/02; H01T 13/54
See application file for complete search history.

(56) References Cited

U.S. PATENT DOCUMENTS 3,921,605 A 11/1975 Wyczalek
4,092,969 A 6/1978 Ono
(Continued)

FOREIGN PATENT DOCUMENTS

CN 107339149 A 11/2017
CN 110094257 A 8/2019
(Continued)

OTHER PUBLICATIONS

China Office Action with Search Report for CN202080097415.9 dated Mar. 17, 2023 with translation (19 pages).
(Continued)

*Primary Examiner* — Xiao En Mo
(74) *Attorney, Agent, or Firm* — Fishman Stewart PLLC

(57) ABSTRACT

A spark ignited engine is disclosed. The spark ignited engine includes a main combustion chamber and a cylinder head at least partially surrounding the main combustion chamber. A spark plug having a central axis is arranged in the cylinder head and an ignition end of the spark plug faces the main combustion engine. A pre-chamber with at least two nozzles is arranged in the main combustion chamber and connects the ignition end and the main combustion chamber via the at least two nozzles. A pre-chamber volume ratio corresponds to a ratio of a volume of the pre-chamber to a volume of the main combustion chamber at a top-dead-center and is between 1.9% and 3.1%. A nozzle factor corresponds to a ratio of a summed flowed-through area of the at least two nozzles to the volume of the pre-chamber and is between 0.085 l/cm and 1.15 l/cm.

20 Claims, 2 Drawing Sheets

(51) Int. Cl.
*F02P 3/02* (2006.01)
*H01T 13/54* (2006.01)

(56) References Cited

U.S. PATENT DOCUMENTS

| | | | | |
|---|---|---|---|---|
| 4,183,343 | A | 1/1980 | Tanahashi et al. | |
| 4,218,992 | A * | 8/1980 | Latsch | F02B 19/08 123/263 |
| 4,327,681 | A | 5/1982 | Latsch | |
| 4,534,327 | A | 8/1985 | Latsch | |
| 7,847,624 | B2 | 12/2010 | Sako | |
| 7,856,956 | B2 | 12/2010 | Inoue | |
| 9,850,806 | B2 | 12/2017 | Sotiropoulou | |
| 10,458,311 | B2 * | 10/2019 | Blaxill | F02B 19/1028 |
| 2009/0133667 | A1 * | 5/2009 | Inoue | F02B 19/12 123/260 |
| 2009/0205468 | A1 * | 8/2009 | Gagliano | F02B 19/12 81/124.6 |
| 2012/0240890 | A1 | 9/2012 | Johng | |
| 2016/0053673 | A1 * | 2/2016 | Sotiropoulou | F02B 19/12 123/260 |
| 2017/0314456 | A1 | 11/2017 | Blaxill et al. | |

FOREIGN PATENT DOCUMENTS

| | | | | |
|---|---|---|---|---|
| DE | 2503811 | A1 | 8/1975 | |
| EP | 3239487 | A1 | 11/2017 | |
| EP | 3001008 | B1 * | 6/2021 | F02B 19/1057 |
| JP | 6196105 | B2 | 3/1974 | |
| JP | S50108407 | A | 8/1975 | |
| JP | S51141909 | A | 12/1976 | |
| JP | S5281405 | B2 | 7/1977 | |
| JP | S52106009 | B2 | 9/1977 | |
| JP | S53107511 | A | 9/1978 | |
| JP | S5517689 | A | 2/1980 | |
| JP | 2123282 | A | 5/1990 | |
| JP | H06241047 | A | 8/1994 | |
| JP | H08284665 | A | 10/1996 | |
| JP | H094551 | A | 1/1997 | |
| JP | 2000345949 | A | 12/2000 | |
| JP | 200777902 | A | 3/2007 | |
| JP | 6157310 | B2 | 3/2013 | |
| JP | 6019726 | B2 | 11/2016 | |

OTHER PUBLICATIONS

Korean Opinion Submission Notice dated Mar. 3, 2023 for Korean Patent Application No. 10-2022-7032608.

Japanese Notice of Reasons for Refusal dated Feb. 14, 2023 for Japanese Patent Application No. 2022-548611.

Chinese Decision on Rejection dated Jun. 29, 2023 for Chinese Patent Application No.

Japanese Notice of Reasons for Refusal dated Jun. 12, 2023 for Japanese Patent Application No. 2022-548611.

Japanese Rejection of Application dated Sep. 25, 2023 for Japanese Patent Application No. 2022-548611.

* cited by examiner

SPARK IGNITED ENGINE WITH A PRE-CHAMBER, A PRECHAMBER AND AN ADAPTER INSERT FOR THE ENGINE

CROSS-REFERENCE TO RELATED APPLICATION

This application claims priority to International Patent Application No. PCT/US2020/019413 filed Feb. 24, 2020, the contents of which is hereby incorporated by reference in its entirety.

TECHNICAL FIELD

The invention relates to a spark ignited engine with a pre-chamber. The invention also relates to an adapter insert with the pre-chamber and to the pre-chamber for the engine.

BACKGROUND

A spark plug is used in a spark ignited engine for ignition of charge—mixed fuel and air—in a main combustion chamber of a cylinder in the engine. A passive pre-chamber can be arranged on the spark plug and can be connected to the main combustion chamber via nozzles. The use of a pre-chamber is for example known from U.S. Pat. Nos. 3,921,605 A, 4,218,992 A, 4,092,969 A and 9,850,806 B2. The ignition of the charge occurs in the pre-chamber and extends through the nozzles via jets of partially combusted charge to the main combustion chamber. There, during the compression stroke of the engine, charge is forced from the main combustion chamber into the pre-chamber and then is ignited by the spark plug. The partially combusted charge flows to the main combustion chamber via the nozzles and the charge in the main combustion chamber is ignited at multiple points. In this way, a faster combustion in the main combustion chamber can be reached and knock in the engine can be avoided. The pre-chamber also enables the ignition of dilute mixtures that would not be possible with a conventional spark plug without a pre-chamber. The use of pre-chambers is well established in motorsport-applications, but has not yet crossed over to road car applications. That is because challenges of achieving acceptable combustion stability at low engine loads—such as idle—and at retarded combustion phasing—such as heat generating for the exhaust catalyst during the initial cold start.

EP 3 239 487 A1 discloses an engine comprising an ignition device having an igniter portion and a fuel injector both arranged in a pre-chamber. The inner volume of the pre-chamber is less than 5% and in particular the range of 0.3% to 3% of the minimum volume of the combustion chamber.

DE 25 03 811 A1, US 2009/205468 A1, U.S. Pat. Nos. 4,218,992 A, 4,327,681 A, US 2009/33667 A1, US 2012/240890 A1, US 2016/053673 A1 discloses further ignition devices with a pre-chamber.

SUMMARY

The object of the invention is therefore to specify an improved or at least alternative embodiment for a spark ignited engine of the generic type to overcome the described disadvantages. Especially, the object of the invention is to specify a pre-chamber which enables the operation of the engine over the whole speed load map and especially under low engine load and/or under retarded combustion phasing and/or cold start conditions.

According to the invention, this object is achieved by the subject matter of independent Claims. Advantageous embodiments are the subject matter of the dependent claims.

A spark ignited engine contains at least one main combustion chamber and a cylinder head which at least partially surrounds the main combustion chamber. The engine contains a spark plug which has a central axis and is arranged in the cylinder head. There, an ignition end of the spark plug faces the main combustion chamber. In other words, the spark plug penetrates the cylinder head with the ignition end from the outside in the direction of the main combustion chamber. A pre-chamber with at least two nozzles is arranged in the main combustion chamber and connects the ignition end of the spark plug and the main combustion chamber via the nozzles. In other words, the pre-chamber with the nozzles is arranged between the ignition end of the spark plug and the main combustion chamber. According to the invention, a pre-chamber volume ratio corresponds to a ratio of the volume of the pre-chamber to the volume of the main combustion chamber at the top-dead-center and is between 1.9% and 3.1%. Furthermore, a nozzle factor corresponds to a ratio of a summed flowed-through area of the nozzles to the volume of the pre-chamber and is between 0.085 l/cm and 1.15 l/cm.

It goes without saying that the top-dead-center is a piston position of a cylinder with the said main combustion chamber. The volume of the main combustion chamber at the top-dead-center has a minimum. The pre-chamber volume ratio defines the ignition energy available from the combustion in the pre-chamber. If the pre-chamber volume ratio is lower than 1.9%, the ignition energy is insufficient at low engine loads and penetration of the jets of combusted charge into the main combustion chamber is reduced. Conversely, if the pre-chamber volume ratio is larger than 3.1%, the excessive pressure in the pre-chamber is too high at high engine loads and thermal losses are increased. The nozzle factor relates to the ability to allow flow out of the pre-chamber after combustion and to replenish the pre-chamber with fresh charge. The nozzle factor can also be used to control the pressure rise in the pre-chamber during its combustion event, which in turn effects the penetration of the jets of partially combusted charge into the main combustion chamber and the location of ignition points in the main combustion chamber. Advantageously, the use of the pre-chamber with the pre-chamber volume ratio between 1.9% and 3.1% and with the nozzle factor between 0.085 l/cm and 1.15 l/cm enables an optimal combustion over a whole operating map and under conditions of low engine load, retarded combustion phasing and cold start of the engine. The spark ignited engine can be used in passenger vehicles, in commercial vehicles, in motorbikes, in recreational vehicles, as a stationary engine or in other applications. The spark ignited engine can use gasoline or other types of fuel.

Advantageously, it can be provided that a nozzle aspect ratio corresponds to a ratio of the length of the respective nozzle to the diameter of the respective nozzle. The nozzle aspect ratio is between 1.7 and 2.2. The nozzle aspect ratio allows the control over the velocity and penetration of the individual jets of combusted charge into the main combustion chamber. Furthermore, the nozzle aspect ratio ensures adequate quenching of the combustion event in the pre-chamber as it exits through the nozzles, thereby providing the jets of partially combusted charge needed to initiate the combustion in the main combustion chamber.

Advantageously, it can be provided that the pre-chamber is formed as an integral part of the cylinder head. The spark plug is then directly engaged with the cylinder head within a hole which penetrates the cylinder head and leads into the pre-chamber. Preferably, the spark plug has a standardized size. The pre-chamber can be formed by casting of the cylinder head or can be mechanically incorporated in the casted cylinder head. Alternatively to this embodiment, the pre-chamber can be formed as an integral part of the cylinder head and the spark plug can then be engaged with the cylinder head via an adapter and within a hole which penetrates the cylinder head and leads into the pre-chamber. Preferably, the spark plug has a standardized size. The pre-chamber can be formed by casting of the cylinder head or can be mechanically incorporated in the casted cylinder head. Alternatively to the embodiments described above, the pre-chamber can be formed as an integral part of the spark plug. Thus, the spark plug with the pre-chamber can be engaged with the cylinder head within an inserting hole which penetrates the cylinder head and leads into the main combustion chamber.

Alternatively to the embodiments of the pre-chamber described above, the engine can contain an adapter insert with a hollow cylindrical secure section and a hollow cylindrical insert section. The secure section and the insert section are axially adjacent to each other and do not axially overlap with each other. Thus, the secure section and the insert section have the same central axis which defines a central axis of the adapter insert. The ignition end of the spark plug is completely arranged in the secure section and the insert section is arranged in an inserting hole. The inserting hole is formed in the cylinder head and leads from the outside into the main combustion chamber. If the spark plug is inserted in the adapter insert and the adapter insert is inserted in the inserting hole, the central axes of the adapter insert and of the spark plug and of the inserting hole are the same. In other words, the adapter insert and the inserting hole and the spark plug are arranged concentrically. The pre-chamber is formed in the insert section of the adapter insert. The adapter insert contains the insert section and the secure section which do not axially overlap with each other. In this way, the secure section can be adapted to the spark plug and the insert section can be adapted to the inserting hole in the cylinder head independently to each other. Advantageously, the use of the adapter insert enables mounting of the pre-chamber in existing engines without pre-chambers.

It can also be provided that the secure section of the adapter insert is screwed with the spark plug via a first thread, so that the spark plug is tightly fitted to the outside. The insert section of the adapter insert is screwed within the inserting hole with the cylinder head via a second thread, so that the adapter insert is tightly fitted to the outside. It goes without saying that the diameter of first thread is smaller than the diameter of the second thread. Advantageously, the first thread of the secure section and the second thread of the insert section do not axially overlap. In this way, the secure section can be adapted to the spark plug and the inset section can be adapted to the inserting hole in the cylinder head independently to each other. Furthermore, without overlapping of the secure section and the insert section the adapter insert can be technical implemented in a simple way. Preferably, the first thread and the second thread are standardized. Preferably, the standardized first thread is M10 or M12 and the standardized second thread is M12 or M14. In this way, the use of the standardized M10 or M12 spark plug in the standardized M12 or M14 inserting hole is enabled. M10, M12 and M14 are the ISO-normed dimensions of the threads. The M10, M12 and M14 threads correspond with diameters of 10.00 mm, 12.00 mm and 14.00 mm.

Alternatively to the embodiment of the adapter insert described above, the insert section of the adapter insert can be material-bounded or can be press-fitted within the inserting hole of the cylinder head. In this way, the adapter insert is permanently fixed in the inserting hole and is tightly fitted to the outside. The secure section of the adapter insert can be screwed with the spark plug via a thread, so that the spark plug is tightly fitted to the outside. Preferably, the thread is standardized. Preferably, the standardized thread is here M12 or M14, so that the use of standardized M10 or M12 spark plug is enabled.

Advantageously, it can be provided that a first circumferential stop is formed on the adapter insert between the insert section and the secure section. In other words, the first stop is formed externally and all around the adapter insert between the insert section and the secure section. The first stop can be formed by an axial external face of the secure section. Via the first stop, the adapter insert is axially supported on an outer side of the cylinder head. Advantageously, the adapter insert can be tightly fitted to the cylinder head on the first stop. Alternatively or additionally, a second circumferential stop can be formed on the adapter insert by the secure section and is faced away from the insert section. In other words, the second stop is formed externally and all around the adapter insert by an axial external face of the secure section. Via the second stop, the spark plug can be axially supported on an outer side of the adapter insert. Advantageously, the spark plug can be tightly fitted to the adapter insert on the second stop.

Advantageously, it can be provided that the engine contains an ignition coil for the spark plug, wherein the ignition coil has a variable spark duration between 60 μs and 1000 μs and/or is designed to provide multi-strike spark events. The ignition coil can be integrated in the spark plug or can be a separated part arranged on the spark plug. Independently of that, the ignition coil is connected to the ignition end of the spark plug and can initiate a spark event on the ignition end. In harsh applications, for example at low engine loads, the use of such an ignition coil can increase the combustion stability. In some cases at low engine loads, the charge in the pre-chamber is not conducive at the time of normal ignition and the combustion cannot be initiated. By extending the spark duration or by delivering the multi-strike spark events, the ignition in these cases can occur later when the charge in the pre-chamber is conducive. In this way, misfire or partial burn events can be avoided. In summary, further benefits in terms of robustness under extreme operating conditions—for example at very low engine loads and/or at cold start spark retard for catalyst heating and/or at high levels of charge dilution—can be realized. Especially, it enables operation over a whole operating map and under cold start of the engine. Furthermore, no use of a second igniter is necessary.

The invention further relates to a pre-chamber for the spark ignited engine described above. The pre-chamber contains at least two nozzles and is configured for connecting an ignition end of a spark plug and a main combustion chamber of the engine via the nozzles. The pre-chamber is characterized by a pre-chamber volume ratio and by a nozzle factor. The pre-chamber volume corresponds to a ratio of the volume of the pre-chamber to the volume of the main combustion chamber at the top-dead-center and is between 1.9% and 3.1%. The nozzle factor corresponds to a ratio of a summed flowed-through area of the nozzles to the volume of the pre-chamber and is between 0.085 l/cm and 1.15 l/cm.

Furthermore, the pre-chamber can be characterized by a nozzle aspect ratio. The nozzle aspect ratio corresponds to a ratio of the length of the respective nozzle to the diameter of the respective nozzle and can be between 1.7 and 2.2. Advantageously, the pre-chamber can be formed as an integral part of the cylinder head. There, the pre-chamber can be formed by casting of the cylinder head or can be mechanically incorporated in the casted cylinder head. Alternatively, the pre-chamber can be formed in an adapter insert. In this way, the pre-chamber can be mounted in existing engines without pre-chambers. Alternatively, the pre-chamber can be formed as an integral part of the spark plug. In this embodiment, the pre-chamber can also be mounted in existing engines without pre-chambers.

The invention further relates to an adapter insert for the spark ignited engine described above. The adapter insert contains a hollow cylindrical secure section and a hollow cylindrical insert section. The secure section and the insert section are axially adjacent to each other and do not axially overlap with each other. Thus, the secure section and the insert section have the same central axis which defines a central axis of the adapter insert. The ignition end of the spark plug can be completely arranged in the secure section and the insert section can be arranged in an inserting hole which penetrates the cylinder head and leads into the main combustion chamber. The pre-chamber is then formed in the insert section of the adapter insert.

Thus, the secure section of the adapter insert can be configured for screwing with the spark plug via a first thread. The insert section of the adapter insert can be configured for screwing within the inserting hole with the cylinder head via a second thread. Preferably, the first thread and the second thread are standardized. The standardized first thread can be M10 or M12 and the standardized second thread can be M12 or M14. In this case, the use of standardized M10 or M12 spark plug in the standardized M12 or M14 inserting hole is enabled. Alternatively, the insert section of the adapter insert can be configured for material-bounding or for press-fitting within the inserting hole with the cylinder head.

Further important characteristics and advantages of the invention proceed from the sub-claims, from the drawings, and from the associated description of the figures, which refers to the drawings.

It is understood that the above-mentioned characteristics, and those described hereinafter, can not only be applied in the respective combination indicated, but also in other combinations, or in isolation, without departing from the scope of the present invention.

Preferred exemplary embodiments of the invention are represented in the drawings and are described in greater detail in the following description, wherein the same reference symbols refer to identical, similar, or functionally equivalent components.

BRIEF DESCRIPTION OF THE DRAWINGS

It shows, in each case schematically

DETAILED DESCRIPTION

Figure 1:
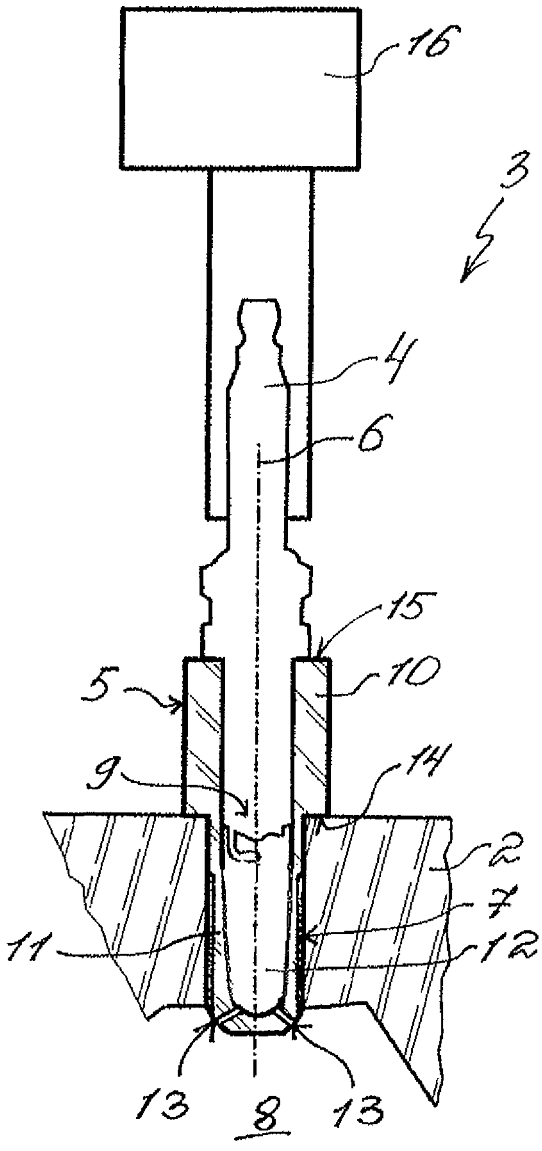
FIGS. 1 to 4 sectional views of a spark ignited engine according to the invention, wherein a pre-chamber is differently mounted in the engine.

FIG. 1 shows a sectional view of a spark ignited engine 3 in a first embodiment. The engine 3 contains a main combustion chamber 8 and a cylinder head 2 which partially surrounds the main combustion chamber 8. An inserting hole 7 is formed in the cylinder head 2 and leads from the outside into the main combustion chamber 8. An adapter insert 5 is arranged in the inserting hole 7 of the cylinder head 2 and a spark plug 4 with a central axis 6 is arranged in the adapter insert 5. Thereby, an ignition end 9 of the spark plug 4 is completely arranged in the adapter insert 5. The spark plug 4, the adapter insert 5 and the insertion hole 7 and the spark plug 4 have the same central axis 6 or, in other words, are arranged concentrically to each other. The adapter insert 5 contains a secure section 10 and an insert section 11, which are arranged axially adjacent to each other and do not axially overlap. The terms "axial" and "radial" always refer to the central axis 6.

The spark plug 4 is arranged in the secure section 10 of the adapter insert 5 and is screwed with it via a standardized first thread M10 or M12. The adapter insert 5 is arranged with its insert section 11 in the inserting hole 7 and is screwed with the cylinder head 2 via a standardized second thread M12 or M14. The first thread of the secure section 10 and the second thread of the insert section 11 do not axially overlap. In other case, not enough metal would be available for technical implementation of the connection between the secure section 10 and the insert section 11. Advantageously, the M10 or M12 standardized spark plug 4 can be used for the M12 or M14 standardized inserting hole 7 in the cylinder head 2.

In the insert section 11 of the adapter insert 5, a passive pre-chamber 12 with nozzles 13 is formed. The nozzles 13 penetrate the insert section 11 of the adapter insert 5 and fluidically connect the ignition end 9 of the spark plug 4 and the main combustion chamber 8. A pre-chamber volume ratio corresponds to a ratio of the volume of the pre-chamber 12 to the volume of the main combustion chamber 8 at the top-dead-center and is between 1.9% and 3.1%. A nozzle factor corresponds to a ratio of a summed flowed-through area of the nozzles 13 to the volume of the pre-chamber 12 and is between 0.085 l/cm and 1.15 l/cm. A nozzle aspect ratio corresponds to a ratio of the length of the respective nozzle 13 to the diameter of the respective nozzle 13 and can be between 1.7 and 2.2.

On the adapter insert 5, a first external circumferential stop 14 is formed between the insert section 11 and the secure section 10. Via the first stop 14, the adapter insert 5 is axially supported on an outer side of the cylinder head 2 in a tightly-fitted manner. A second external circumferential stop 15 is formed on the adapter insert 5 by the secure section 10 and is faced away from the insert section 11. Via the second stop 15, the spark plug 4 is axially supported on an outer side of the adapter insert 5 in a tightly-fitted manner.

The spark plug 4 contains an ignition coil 16 which can have a variable spark duration between 60 μs and 1000 μs or can be designed to provide multi-strike spark events. In this way, in harsh applications—for example at low engine loads and/or at cold start spark retard for catalyst heating and/or at high levels of charge dilution,—misfire or partial burn events can be avoided in the main combustion chamber 8.

Figure 2:
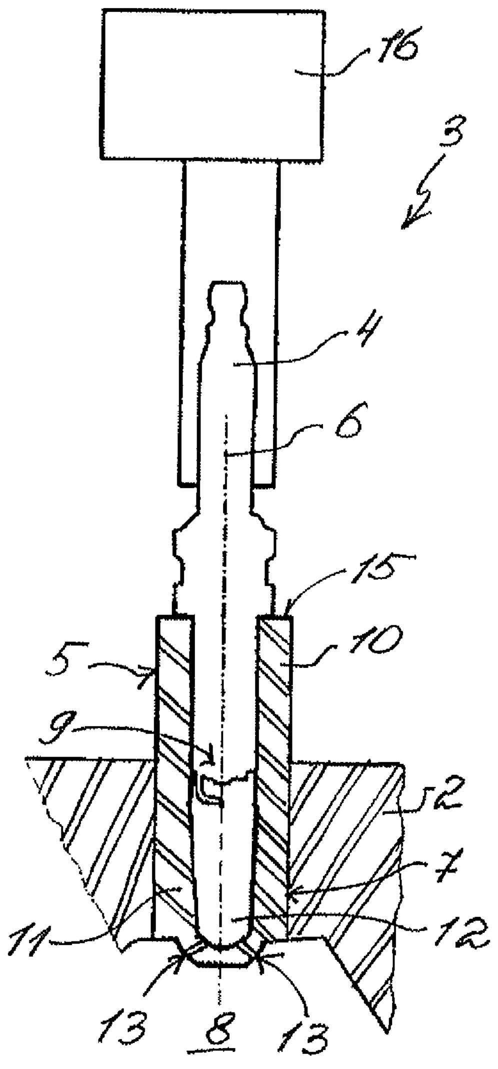

FIG. 2 shows a sectional view of the spark ignited engine 3 in a second embodiment. In difference to the first embodiment of the engine 3, the adapter insert 5 is press-fitted within the inserting hole 7 with the cylinder head 2. Consequently, the insert section 11 of the adapter insert 5 and the inserting hole 7 of the cylinder head 2 do not contain any threads. Thus, the adapter insert 5 is unmovably fixed in the inserting hole 7. Otherwise, the engine 3 in the second embodiment corresponds to the first embodiment of the engine 3.

Figure 3:
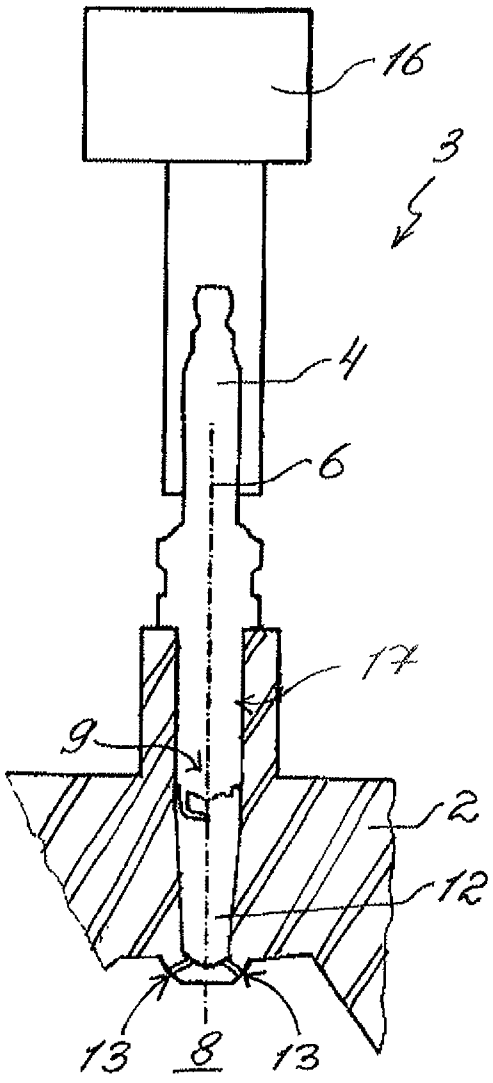

FIG. 3 shows a sectional view of the spark ignited engine 3 in a third embodiment. In difference to the first and second embodiment of the engine 3, the pre-chamber 12 is integrally formed on the cylinder head 2 and the engine 3 does not contain here an adapter insert. The pre-chamber 12 is formed by casting of the cylinder head 2 and the nozzles are mechanically incorporated in the casted pre-chamber 12. The ignition end 9 of the spark plug 4 is arranged in a hole 17 which penetrates the cylinder head 2 and leads into the pre-chamber 12. Otherwise, the engine 3 in the third embodiment corresponds to the first and second embodiments of the engine 3. The shown embodiment can also be interpreted as the adapter insert 5 having the pre-chamber 12 and casted-in with the cylinder head 2.

Figure 4:
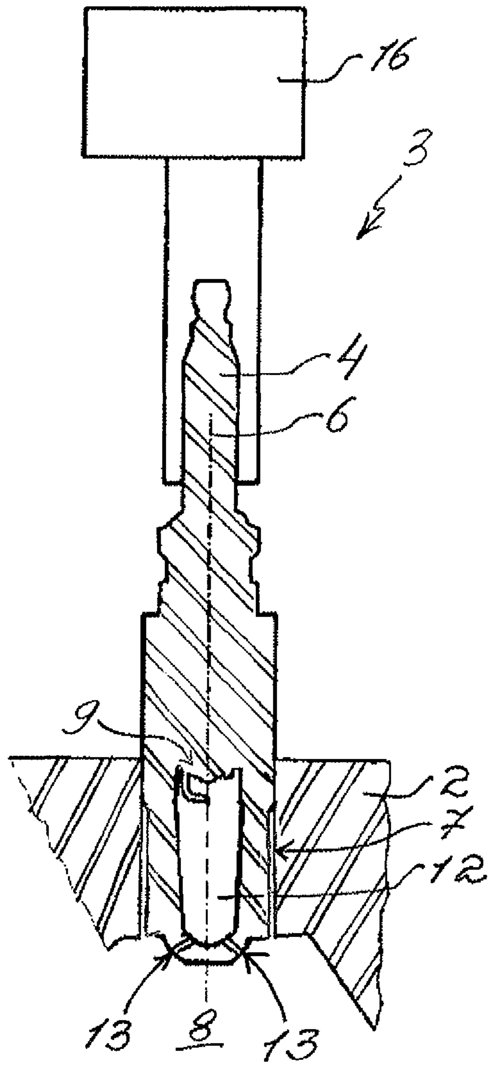

FIG. 4 shows a sectional view of the spark ignited engine 3 in a fourth embodiment. In difference to the first, second and third embodiment of the engine 3, the pre-chamber 12 is integrally formed on the spark plug 4 and the spark plug 4 with the pre-chamber 12 is screwed within the insertion hole 7 of the cylinder head 2. In the fourth embodiment, the engine 3 does not contain an adapter insert. The pre-chamber 12 is formed by body of the spark plug 4 and the nozzles 13 are mechanically incorporated with in this body. Otherwise, the engine 3 in the fourth embodiment corresponds to the first, second and third embodiments of the engine 3.

The use of the pre-chamber 12 according to the invention enables an optimal combustion over a whole operating map and under conditions of low engine load, retarded combustion phasing and cold start of the engine. The use of the adapter insert 5 according to the invention enables mounting of the pre-chamber 12 in existing engines 3. Especially, the M10 or M12 standardized spark plug 4 can be used for the M12 or M14 standardized inserting hole 7 in the cylinder head 2. The spark ignited engine 3 according to the invention can advantageously be operated over a whole operating map and by cold start.

The invention claimed is:

1. A spark ignited engine, comprising:
at least one main combustion chamber and a cylinder head that at least partially surrounds the at least one main combustion chamber,
a spark plug having a central axis arranged in the cylinder head and an ignition end of the spark plug faces the at least one main combustion chamber,
a pre-chamber with at least two nozzles arranged in the at least one main combustion chamber and connects the ignition end of the spark plug and the at least one main combustion chamber via the at least two nozzles,
wherein a pre-chamber volume ratio corresponds to a ratio of a volume of the pre-chamber to a volume of the at least one main combustion chamber at a top-dead-center and the pre-chamber volume ratio is between 1.9% and 3.1%, and
wherein a nozzle factor corresponds to a ratio of a summed flowed-through area of the at least two nozzles to the volume of the pre-chamber and the nozzle factor is between 0.085 l/cm and 1.15 l/cm.

2. The engine according to claim 1, wherein a nozzle aspect ratio corresponds to a ratio of a length of a respective nozzle of the at least two nozzles to a diameter of the respective nozzle and is the nozzle aspect ratio between 1.7 and 2.2.

3. The engine according to claim 1, wherein:
the pre-chamber is structured as an integral part of the cylinder head and the spark plug is directly engaged with the cylinder head within a hole that penetrates the cylinder head and leads into the pre-chamber, or
the pre-chamber is structured as an integral part of the cylinder head and the spark plug is engaged with the cylinder head via an adapter and within a hole that penetrates the cylinder head and leads into the pre-chamber, or
the pre-chamber is structured as an integral part of the spark plug and the spark plug with the pre-chamber is engaged with the cylinder head within an inserting hole that penetrates the cylinder head and leads into the at least one main combustion chamber.

4. The engine according to claim 1, wherein:
an adapter insert is provided with a hollow cylindrical secure section and with a hollow cylindrical insert section,
the secure section and the insert section are axially adjacent to each other and do not axially overlap with each other,
the ignition end of the spark plug is completely arranged in the secure section and the insert section is arranged in an inserting hole that penetrates the cylinder head and leads into the at least one main combustion chamber, and
the pre-chamber is defined in the insert section of the adapter insert.

5. The engine according to claim 4, wherein:
the secure section of the adapter insert is screwed with the spark plug via a first thread, so that the spark plug is tightly fitted to the outside, and
the insert section of the adapter insert is screwed within the inserting hole with the cylinder head via a second thread, so that the adapter insert is tightly fitted to the outside.

6. The engine according to claim 4, wherein:
the secure section of the adapter insert is screwed with the spark plug via a thread, so that the spark plug is tightly fitted to the outside, and
the insert section of the adapter insert is material-bounded or is press-fitted within the inserting hole with the cylinder head, so that the adapter insert is tightly fitted to the outside.

7. The engine according to claim 4, wherein:
a first circumferential stop is provided between the insert section and the secure section, wherein via the first stop, the adapter insert is axially supported on an outer side of the cylinder head, and/or
a second circumferential stop is provided by the secure section and is faced away from the insert section, wherein, via the second stop, the spark plug is axially supported on an outer side of the adapter insert.

8. The engine according to claim 1, further comprising an ignition coil for the spark plug, wherein the ignition coil has a variable spark duration between 60 μs and 1000 μs and/or is configured to provide multi-strike spark events.

9. A pre-chamber for a spark ignited engine, the pre-chamber comprising:
at least two nozzles and is configured for connecting an ignition end of a spark plug and a main combustion chamber via the at least two nozzles;
wherein a pre-chamber volume ratio corresponds to a ratio of a volume of the pre-chamber to a volume of the main combustion chamber at a top-dead-center and the pre-chamber volume ratio is between 1.9% and 3.1%; and
wherein a nozzle factor corresponds to a ratio of a summed flowed-through area of the at least two nozzles to the volume of the pre-chamber and the nozzle factor is between 0.085 l/cm and 1.15 l/cm.

10. An adapter insert for the spark ignited engine according to claim 1, the adapter insert including a hollow cylindrical secure section and a hollow cylindrical insert section, wherein the secure section and the insert section are axially adjacent to each other and do not axially overlap with each other, wherein the ignition end of the spark plug can be completely arranged in the secure section and the insert section can be arranged in an inserting hole that penetrates the cylinder head and leads into the at least one main combustion chamber, and wherein the pre-chamber is defined in the insert section of the adapter insert.

11. The adapter insert according to claim 10, wherein a nozzle aspect ratio corresponds to a ratio of a length of a respective nozzle of the at least two nozzles to a diameter of the respective nozzle and the nozzle aspect ratio is between 1.7 and 2.2.

12. The adapter insert according to claim 11, wherein a first circumferential stop is provided between the insert section and the secure section, wherein via the first circumferential stop, the adapter insert is axially supported on an outer side of the cylinder head.

13. The adapter insert according to claim 11, wherein a second circumferential stop is provided by the secure section and faces away from the insert section, wherein via the second circumferential stop the spark plug is axially supported on an outer side of the adapter insert.

14. The pre-chamber according to claim 9, wherein:

the pre-chamber is structured as an integral part of the cylinder head and the spark plug is directly engaged with the cylinder head within a hole that penetrates the cylinder head and leads into the pre-chamber, or the pre-chamber is structured as an integral part of the cylinder head and the spark plug is engaged with the cylinder head via an adapter and within a hole that penetrates the cylinder head and leads into the pre-chamber, or the pre-chamber is structured as an integral part of the spark plug and the spark plug with the pre-chamber is engaged with the cylinder head within an inserting hole that penetrates the cylinder head and leads into the at least one main combustion chamber.

15. The pre-chamber according to claim 9, further comprising an adapter provided with a hollow cylindrical secure section and a hollow cylindrical insert section, the secure section and the insert section being axially adjacent to each other and do not overlap with each other, wherein the pre-chamber is defined in the insert section of the adapter insert.

16. The pre-chamber according to claim 9, wherein a nozzle aspect ratio corresponds to a ratio of a length of a respective nozzle of the at least two nozzles to a diameter of the respective nozzle and the nozzle aspect ratio is between 1.7 and 2.2.

17. The engine according to claim 2, wherein the pre-chamber is structured as an integral part of the cylinder head and the spark plug is directly engaged with the cylinder head within a hole that penetrates the cylinder head and leads into the pre-chamber.

18. The engine according to claim 2, wherein the pre-chamber is structured as an integral part of the cylinder head and the spark plug is engaged with the cylinder head via an adapter and within a hole that penetrates the cylinder head and leads into the pre-chamber.

19. The engine according to claim 2, wherein the pre-chamber is structured as an integral part of the spark plug and the spark plug with the pre-chamber is engaged with the cylinder head within an inserting hole that penetrates the cylinder head and leads into the at least one main combustion chamber.

20. The engine according to claim 2, further comprising an ignition coil for the spark plug, wherein the ignition coil has a variable spark duration between 60 μs and 1000 μs.

* * * * *